July 23, 1929.  A. C. HAYDEN  1,722,088

MOTION PICTURE CAMERA

Filed May 28, 1923

INVENTOR.
Arthur C. Hayden
By Henry T. Williams,
Atty.

Patented July 23, 1929.

1,722,088

UNITED STATES PATENT OFFICE.

ARTHUR C. HAYDEN, OF BROCKTON, MASSACHUSETTS.

MOTION-PICTURE CAMERA.

Application filed May 28, 1928. Serial No. 280,970.

The invention to be hereinafter described relates to motion picture cameras.

In obtaining good results in projecting motion pictures, it is essential that a substantial length of film shall run through the camera in taking the pictures of each subject. The speed of feed of the film in the camera depends upon the timing of the reel driving motor. A usual speed is at the rate of one foot per two and one-half seconds, and it is found in practice that it is desirable to feed the film at least ten seconds in order to produce photographs on a sufficient length of film to insure projection of the film on the screen long enough to enable the observer to appreciate the subject.

Heretofore, the timing of the exposure of the film has been largely due to guesswork, and while the professional photographer may acquire sufficient skill to estimate the timing with a fair degree of accuracy, this is not true in the case of amateur photographers. They frequently spoil pictures due to underestimating the proper time to run the film on each subject.

A purpose of the present invention, therefore, is to provide means whereby the photographer whether professional or amateur may accurately measure the time required for the proper length of run of the film for securing satisfactory projection of the pictures on the screen. To accomplish this, an automatic audible signal is provided which sounds on equal increments of travel of the film in the camera. The construction is such that the photographer may employ one hand in holding the camera to his eye, and his other hand for controlling starting and stopping of the film feeding motor.

Another purpose of the invention is to provide an audible signal which may be applied to standard motion picture cameras without material alteration in their construction.

Figure 1:
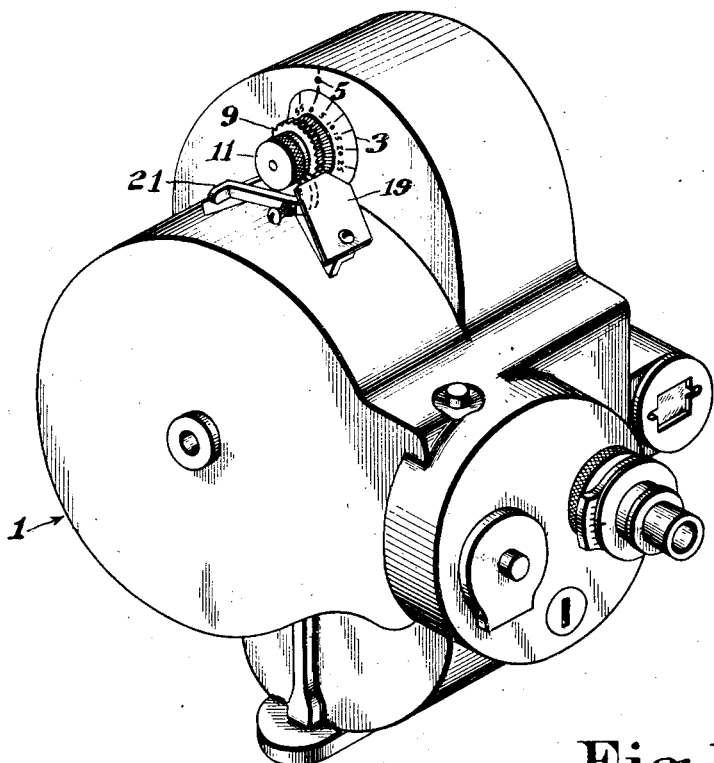
Figure 2:
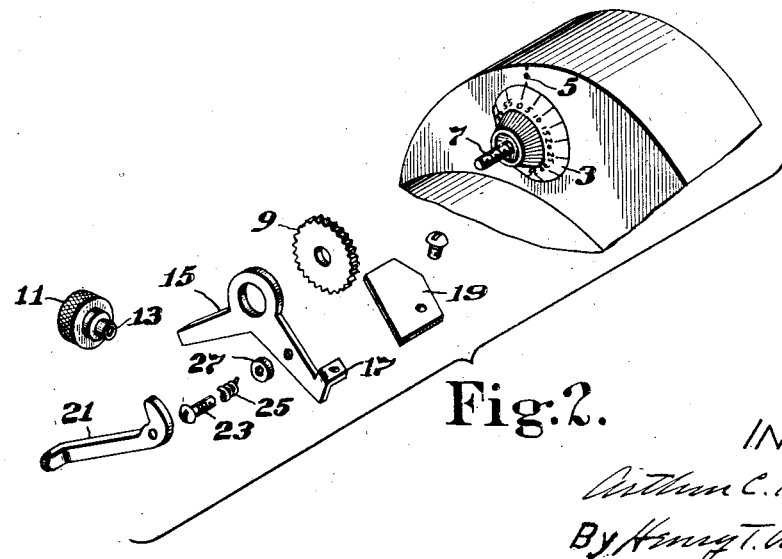

The character of the invention may be best understood by reference to the following description of one good form thereof shown in the accompanying drawings, wherein:

Fig. 1 is a perspective view of the motion picture camera provided with the audible signal device; and Fig. 2 is a perspective view showing a portion of the camera, and the parts of the signal device unassembled.

Referring to the drawings, 1 designates the usual motion picture camera comprising a casing containing a coil spring motor, a take-up reel shaft and a let-off reel shaft and gearing for imparting rotation from the motor to the take-up reel shaft. These parts may be of usual known construction, and therefore, it is unnecessary to show and describe them herein.

Motion picture cameras are provided with means for indicating the length of film fed from one reel to the other. This means comprises an indicator wheel 3 having graduations marked thereon corresponding to the number of feet in length of the film used in the camera, a usual length being one hundred feet. In such case the indicator wheel has graduations marked from zero to one hundred, and these numbers and graduations may be read with respect to an index point 5 on the camera casing. A suitable transmission is provided for causing the indicator wheel to rotate the distance between two adjacent graduations on feed of each foot of film in the camera. Sometimes this is accomplished by continuous and sometimes by step-by-step rotation of the indicator wheel. Since the transmission for these purposes is well known, it is unnecessary to disclose the same herein.

The audible signal means shown herein as one good form of the invention, comprises a screw shaft 7 which is longer than and substituted for the usual screw shaft on which the indicator wheel is mounted. A wheel 9 is mounted on this shaft directly above the indicator wheel and has indentations in its periphery corresponding to the number of graduations on the indicator wheel. A knob 11 is threaded on the screw shaft and has a short neck 13 engaging the indented wheel, and said knob may be set up to press said wheel against the indicator wheel and hold the same in secure frictional engagement to insure rotation of the two wheels in unison.

An arm 15 has a hole therein of a diameter to fit the neck of the knob, and the length of the neck is somewhat greater than the thickness of the arm, so that the latter will be free to receive rotative adjustment on the neck. An end of the arm has a lug 17 projecting therefrom carrying a tempered steel leaf spring 19 which projects laterally a substantial distance beyond the lug. This spring engages the indented wheel adjacent one edge of the spring, and is adapted to slick over the indentations on rotation of the wheel, and each time the end of the spring drops into an indentation it will produce a click or audible signal which is enhanced by the overhang of the spring beyond the lug carrying the same. As a consequence, the photographer will receive an audible signal each time an increment of the film has been fed in the camera, and if the timing of the motor is such that two and one-half seconds are required to feed one foot of film in the camera, and he desires to run the film four seconds to insure obtaining a good picture of a subject, he will start the camera motor, count four clicks, and then stop the motor.

After the entire length of the film has been fed from one reel to another, the indicator wheel should be reset so that the zero mark will be opposite the index point. To permit reversal of the wheel, the signal spring should be held out of engagement with the indented wheel, in order that it may not act as a dog to prevent rotation thereof. To accomplish this, in the present instance, a bell-crank 21 is pivotally mounted on a screw 23 on the spring carrying arm and has a short arm and a long arm. This bell-crank is frictionally held in different positions of adjustment by a coil spring 25 encircling the pin and confined between a washer 27 and the head of the screw.

When the bell-crank is rocked in a clockwise direction, it will lift the leaf spring out of engagement with the indented wheel, and when the bell-crank is rocked in a contra-clockwise direction, it will allow the spring to return into engagement with the wheel due to the inherent resilience of the spring.

This audible signal device may be quickly and easily applied to standard motion picture cameras without material alteration thereof. It is merely necessary to substitute a longer screw for the usual screw carrying the indicator wheel, apply the indented wheel to the shaft, apply the spring carrying arm to the shaft, and screw the knob onto the shaft so that its neck extends into the hole in the arm and presses the indented wheel against the indicator wheel.

After a new film has been placed in the camera and it is desired to commence taking photographs, the knob 11 is grasped and the motor is started to rotate the film carrying reel to remove the paper leader from the film. The proper feed for this purpose is determined by observation of the indicator wheel which should move far enough to bring the graduation numbered 5 opposite the index point. When the entire length of film has been used, if 100 feet in length, the graduation numbered 100 will have been brought in registration with the index point. Then the lever 21 is rocked to move the leaf spring 19 out of engagement with the indented wheel, thereby allowing the indicator wheel to be reset so that its zero mark graduation is in registration with the index point, and now the camera is ready to take photographs on a new film.

The signal device of the present invention is simple and cheap in construction, quickly and easily applied to the camera, and by its use proper length of run of the film to secure pictures which will be projected on the screen for a sufficient length of time to enable the observer properly to appreciate the pictures is assured.

It will be understood that the invention is not limited to the specific embodiment shown, and that various deviations may be made therefrom without departing from the spirit and scope of the appended claims.

What is claimed is:

1. In a motion picture camera having means for feeding a film, the combination of a wheel having indentations thereon automatically rotated by the film feed mechanism, a leaf spring adapted to slick over the indentations, and means adjustable to hold the leaf spring out of engagement with said wheel.

2. In a motion picture camera having means for feeding a film, the combination of a wheel having graduations thereon numbered to indicate the length of film fed through the camera, a wheel having indentations thereon and rotatable with the indicator wheel, a leaf spring adapted to slick over the indentations and click to announce increments of feed of the film, and means adjustably to hold the spring out of engagement with the indented wheel to permit the indicator wheel to be reset after completion of feed of the film in the camera.

3. In a motion picture camera, the combination of means for feeding a film, and a device operated by the film feeding means for automatically, audibly signalling increments of feed of the film.

4. In a motion picture camera, the combination of means for feeding a film, means for indicating the length of the film fed in the camera, and means cooperating with said length indicating means for automatically, audibly announcing increments of feed of the film.

5. In a motion picture camera, the combination of means for feeding a film, a wheel operated by the film feeding means having graduations thereon numbered to indicate the length of film fed to the camera, a wheel having indentations thereon rotated with the indicator wheel, and a leaf spring having an edge adapted to slick over the periphery of the indented wheel and announce time increments of feed of the film.

ARTHUR C. HAYDEN.